United States Patent
Thomas et al.

[11] Patent Number: 5,749,245
[45] Date of Patent: May 12, 1998

[54] REFRIGERANT SEPARATION SYSTEM

[75] Inventors: James V. Thomas, Fall River; Devin James Thomas, Halifax; Kenneth Garfield Ross, Dartmouth, all of Canada

[73] Assignee: Climate Supply (Atlantic) Inc., Dartmouth, Canada

[21] Appl. No.: 773,802

[22] Filed: Jan. 24, 1997

Related U.S. Application Data

[63] Continuation of Ser. No. 492,329, Jun. 19, 1995, abandoned.
[51] Int. Cl.[6] ............................................. F25B 3/00
[52] U.S. Cl. ............................... 62/623; 62/292; 62/918
[58] Field of Search ............................ 62/292, 623, 918

[56] References Cited

U.S. PATENT DOCUMENTS

| | | | |
|---|---|---|---|
| 2,350,006 | 5/1944 | Wolfner | 196/141 |
| 2,502,251 | 3/1950 | Dennis | 62/643 |
| 2,519,892 | 8/1950 | Dennis | 62/643 |
| 2,903,859 | 9/1959 | Kahl | 62/643 |
| 2,944,966 | 7/1960 | Eickmeyer | 208/352 |
| 2,963,872 | 12/1960 | Latimer | 62/643 |
| 3,208,231 | 9/1965 | Becker | 62/643 |
| 3,558,438 | 1/1971 | Schoenbeck | 62/918 |
| 3,600,283 | 8/1971 | Bollen et al. | 203/1 |
| 4,308,106 | 12/1981 | Mannfeld | 203/19 |
| 4,328,073 | 5/1982 | Likins, Jr. | 203/2 |
| 4,463,575 | 8/1984 | McCord . | |
| 4,718,237 | 1/1988 | Sterlini | 60/673 |
| 4,856,290 | 8/1989 | Rodda | 62/149 |
| 5,150,577 | 9/1992 | Mitchell et al. | 62/918 |
| 5,236,558 | 8/1993 | Buyalos et al. . | |
| 5,237,823 | 8/1993 | Cheung et al. | 62/643 |
| 5,245,839 | 9/1993 | Chang et al. . | |
| 5,263,331 | 11/1993 | Sergius . | |
| 5,327,741 | 7/1994 | Manson et al. . | |
| 5,333,461 | 8/1994 | Cobb . | |
| 5,337,567 | 8/1994 | Darredeau | 62/643 |
| 5,339,642 | 8/1994 | Laukhuf . | |
| 5,363,662 | 11/1994 | Todack . | |
| 5,377,499 | 1/1995 | Zugibe . | |
| 5,379,607 | 1/1995 | Sergius . | |
| 5,426,950 | 6/1995 | Ament et al. | 62/85 |

FOREIGN PATENT DOCUMENTS

| | | |
|---|---|---|
| 1223519 | 6/1987 | Canada . |
| 523990 | 1/1993 | European Pat. Off. . |
| 4340206 | 1/1995 | Germany . |
| 4329595 | 9/1995 | Germany . |
| 290878 | 5/1953 | Switzerland . |
| 1148031 | 4/1969 | United Kingdom . |

*Primary Examiner*—Ronald C. Capossela
*Attorney, Agent, or Firm*—Biebel & French

[57] ABSTRACT

The present invention relates to a system for separating a mixture containing at least two components, each component having a different volatility. The separation is achieved through the use of a fractional distillation column and upper and lower storage vessels in conjunction with a chilling unit for forming a liquid phase of the mixture and a generator for forming a gas phase of the mixture.

13 Claims, 3 Drawing Sheets

REFRIGERANT SEPARATION SYSTEM

This is a continuation of application Ser. No. 08/492,329 filed Jun. 19, 1995 now abandoned.

FIELD OF THE INVENTION

The present invention relates to a system for separating a mixture containing at least two components, each component having a different volatility. The separation is achieved through the use of a fractional distillation column and upper and lower storage vessels in conjunction with a chilling unit for forming a liquid phase of the mixture and a generator for forming a gas phase of the mixture.

BACKGROUND OF THE INVENTION

Chlorofluorocarbons (CFC's) are the chemicals in most refrigeration and air conditioning units. In the past, CFC's were routinely vented to the atmosphere rather than captured for re-use during servicing of refrigeration or air-conditioning equipment. This practice has diminished to some extent in recent years following recognition that these chemicals have significantly contributed to the depletion of the earth's ozone layer. In many jurisdictions, government regulations are phasing out the use of CFC's and further require refrigeration and air conditioning manufacturers and contractors to recover CFC's when servicing or disposing of refrigeration and air conditioning equipment.

In the recovery of CFC's, it is often the case that tanks containing the recovered CFC's are cross-contaminated with other refrigerant gases beyond acceptable levels (ARI 700-93 Standard for Fluorocarbon Refrigerants) thereby requiring purification of the gases before re-use.

Accordingly, with the increasing requirement for recovery of CFC's, there has been a need for new technologies which efficiently collect these chemicals, test them for content, determine whether they can be reclaimed and on the basis of that determination either purify the gas for re-use or break down the chemical to less harmful components. Often a contractor collecting CFC's would have to purchase specialized recovery tanks from specific manufacturers, fill them to specified quantities, ship them to centralized locations where the determination for purification or destruction was made. With relatively few centralized plants capable of reclaiming or destroying the CFC's, considerable shipping and incidental expenses would be incurred by the local contractor. Accordingly, there has been a need for an efficient refrigerant reclamation system that provides local access to a reclamation plant without the need for purchasing specialized tanks and that can further reduce or eliminate the need for significant transportation of recovered gases to central locations.

More specifically, there has been a need for a refrigerant reclamation system that is simple to operate and which effectively and efficiently obtains high purity levels of refrigerant gases which can be re-bottled and re-used. Industry standards usually require less than 0.5% cross-contamination of a refrigerant gas. In particular, there has been a need for a refrigerant reclamation system which uses a distillation method to effect separation of mixed gases where depending upon the relative volatility between the gases making up the mixture will collect in different areas of the system. Furthermore, there has been a need for a refrigerant separation system which through a combination of vaporization, and condensation of the refrigerant gases effects separation by countercurrent flow of the refrigerant gas/liquid through a fractional distillation column where the waste heat from the chilling process in one location of the system is utilized for volatization in a separate location of the system.

There has been a still further need for a refrigerant separation system where the design of the fractional distillation column maximizes surface area contact between counter-current flowing gas/liquid to effect separation.

Examples of past CFC reclamation systems can be found in the prior art, for example, U.S. Pat. No. 5,379,607, U.S. Pat. No. 5,245,839, U.S. Pat. No. 5,363,662, U.S. Pat. No. 5,377,499, and U.S. Pat. No. 5,327,741, each of which disclose refrigerant recovery systems, and which none disclose a separation system in accordance with the invention as described below.

SUMMARY OF THE INVENTION

In accordance with the invention, a system for separating a mixture containing at least two components is provided where each component in the mixture has a different volatility. The system comprises:

i) a vapour generator for volatizing the mixture;

ii) a chilling unit for condensing the mixture;

iii) a fractional distillation column (FDC) in fluid communication between the vapour generator and chilling unit for effecting counter-current flow of gas and liquid phases of the mixture;

iv) a first storage vessel between the chilling unit and FDC for holding a liquid phase of the mixture from the chilling unit and for feeding the liquid phase to the FDC;

v) a means for controlling the flow of liquid phase of the mixture from the first storage vessel to the FDC;

vi) a second storage vessel for storing liquid phase of the mixture from the FDC and for supplying liquid phase of the mixture to the vapour generator.

In more specific embodiments of the invention, the system may also Include a condensing unit for supplying cooling energy to the chilling unit and for supplying heating energy to the vapour generator and the first storage vessel may be selected from one or more Interconnected first storage vessels.

The system may also Include a pressure control means for shutting down the system in the event of excessive pressure in the system.

In a preferred embodiment of the system, the FDC has top, middle and bottom sections and comprises a plurality of Interconnected tubular sections, each interconnected tubular section having a distributor plate. The FDC may also Include a loading Inlet in the middle section of the column.

In accordance with the invention, a process is also provided for separating a mixture containing at least two components, each component in the mixture having a different volatility, the process comprising the steps of:

a) feeding a vapour phase of the mixture to the bottom of a fractional distillation column (FDC), the vapour phase in counter-current flow to a liquid phase of the mixture within the fractional distillation column;

b) condensing the vapour phase at the top of the FDC to form an upper liquid phase and holding the upper liquid phase in an upper storage vessel;

c) feeding a portion of the upper liquid phase to the top of the FDC to provide the counter-current flow within the FDC and to form a lower liquid phase at the bottom of the FDC;

d) collecting and holding the lower liquid phase in a lower storage vessel;

e) volatizing the lower liquid phase to form the vapour phase for step a);

wherein liquids of the mixture having a lower boiling point are concentrated within the upper storage vessel and liquids having a higher boiling point are concentrated in the lower storage vessel.

BRIEF DESCRIPTION OF THE DRAWINGS

These and other features of the invention will become more apparent from the following description in which reference is made to the appended drawings wherein.

DETAILED DESCRIPTION

Figure 1:
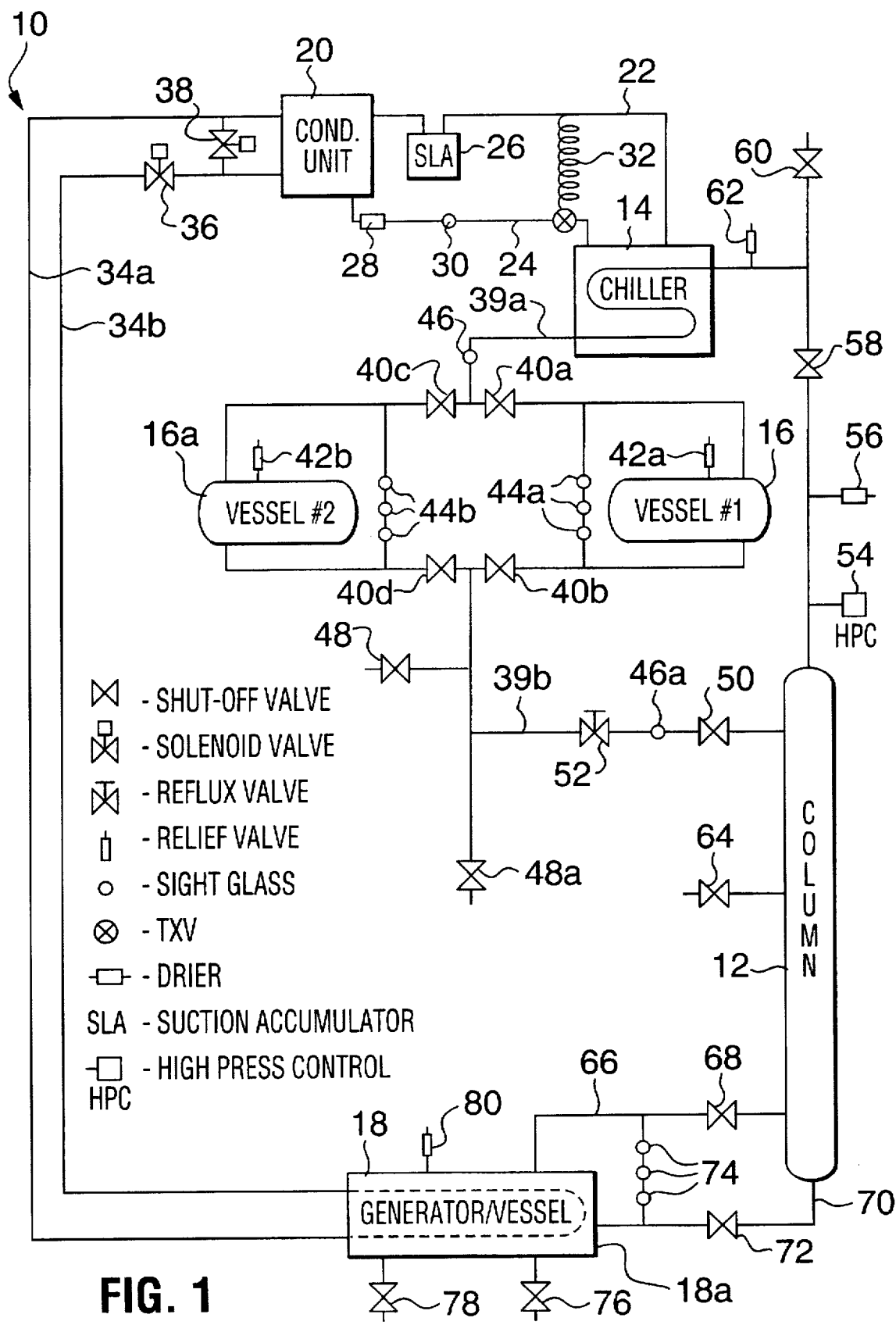
FIG. 1 is a schematic diagram of the components and operation of the separation system.
Figures 2, 2A:
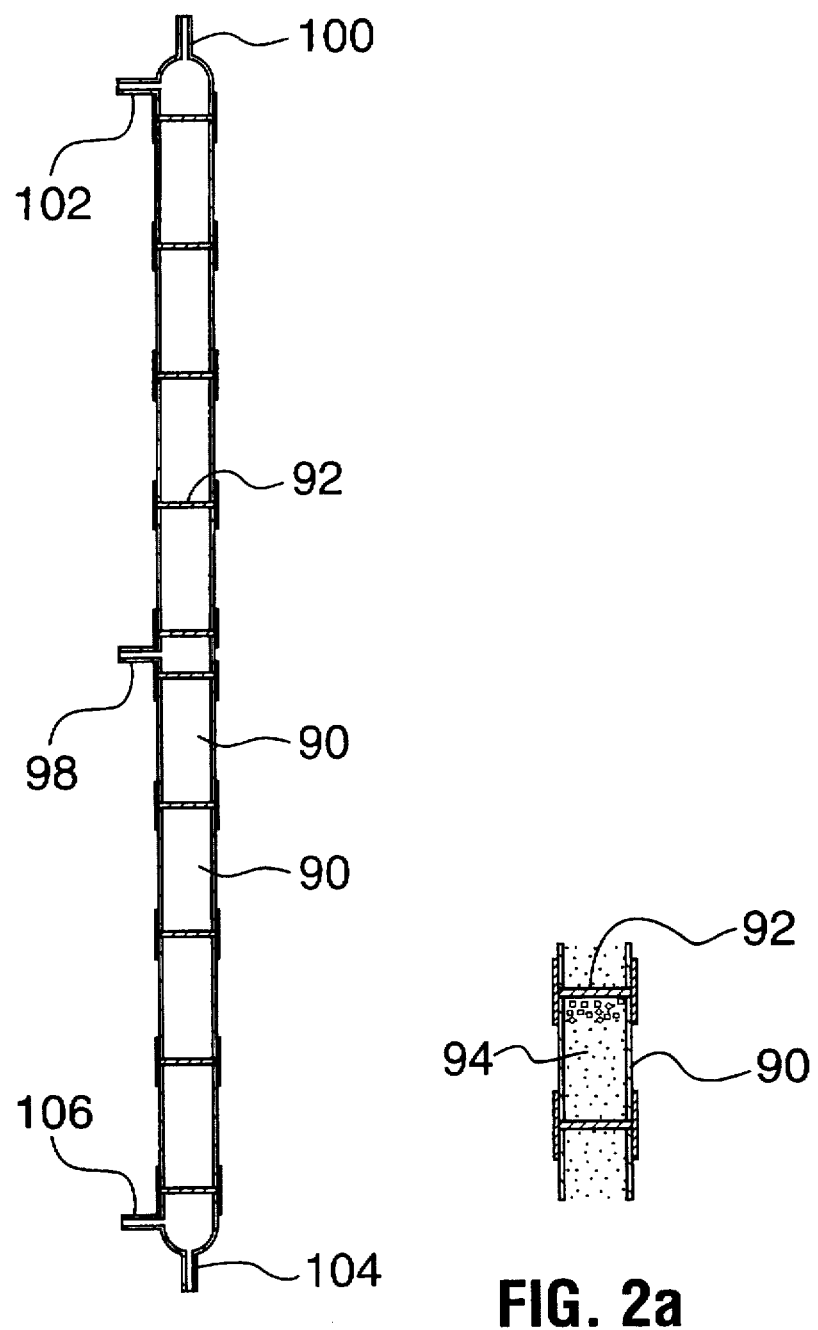
FIG. 2 is a cross-sectional diagram of a fractional distillation column in accordance with the invention.
FIG. 2a is a cross-sectional diagram of a section of the fractional distillation column showing details of the packing material and distributor plates.
Figure 3:
FIG. 3 is a cross-sectional diagram of a section of a distributor plate in accordance with the invention.
Figure 3A:
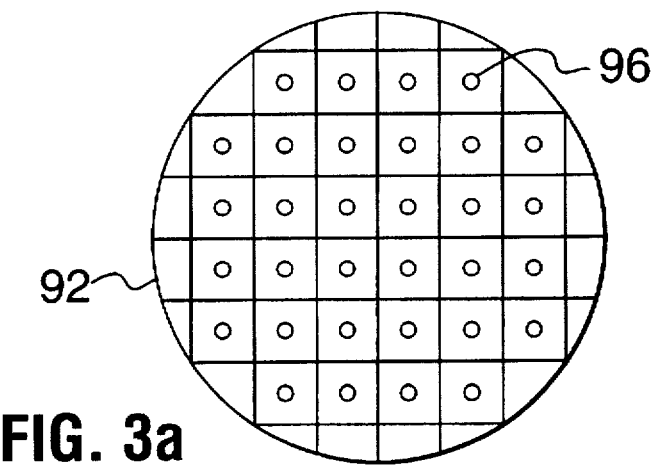
FIG. 3a is a plan view of a distributor plate.
Figure 4:
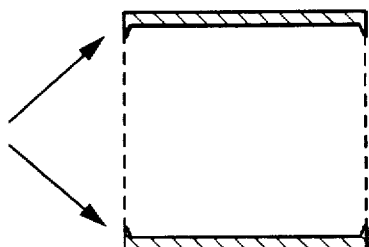
FIG. 4 is a cross-sectional diagram of typical packing material used in accordance with the invention.
Figure 4A:
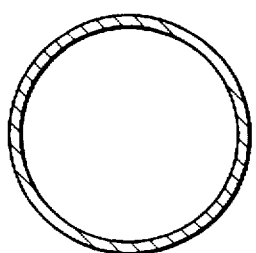
FIG. 4a is a plan view of typical packing material used in accordance with the invention.

In accordance with the invention and with reference to FIG. 1, an apparatus and process for the separation of a mixture of gas/liquids is described below. The separation system 10 is a closed system which includes a fractional distillation column 12 interconnected with a chilling unit 14, at least one upper storage vessel 16, generator 18 and lower storage vessel 18a. As an overview, the system 10 is charged with a fixed volume of a gas/liquid mixture where the gas/liquid mixture includes at least two components having different volatilities. The temperature and pressure of the system are controlled in order to facilitate the rapid conversion of the components of the mixture between their liquid and gas phases. When the system is turned on, a counter-current flow is established within the fractional distillation column 12 whereby liquid phase components of the mixture flow, through gravity, downwardly through the FDC to the lower storage vessel 18 and vapour phase components flow upwardly, counter-current to the falling liquid phase. At the top of the column 12, vapour is carried to the chilling unit 14 and upper storage vessel 16. At the upper portion of the system 10, the vapour phase is condensed to a liquid phase by the chilling unit 14 and held in the upper storage vessel 16. A portion of the liquid phase components in the upper storage vessel 16 is returned to the upper portion of the FDC 12 to provide the counter-current flow. At the bottom of the column, liquid phase components are collected in the lower storage vessel 18. Controlled heating of the lower storage vessel 18 permits volatization of the liquid phase components to a vapour phase which are returned to the lower portion of the FDC for upward movement countercurrent to the falling liquid phase.

Through control of the operating parameters, namely pressure, temperature and reflux of liquid phase components to the upper portion of the FDC, the mixture can be separated into constituent components based upon the relative volatility of each component where those constituent components having a lower boiling point will tend to accumulate in the upper storage vessel and the constituent components having a higher boiling point will collect in the lower storage vessel.

In order to effect maximum efficiency of the system, the various components of the system are interconnected to efficiently make use of the heat energy generated by the operation of the system as well as to facilitate loading and removal of refrigerants and system safety. Accordingly, as can be seen from FIG. 1, the chilling unit is cooled by a condensing unit 20 through pipelines 22 and 24. Pipeline 22 is preferably ½ inch refrigeration tubing with a suction accumulator 26 used to protect the condensing unit compressor from liquid slugging. Pipeline 24 is preferably ¼ inch refrigeration tubing with drier 28 for drying condensing unit gases and sight glass 30 for viewing fluid levels within the pipe 24. Pipes 22 and 24 are also interconnected with a thermal expansin valve 32 to control the condensing unit liquid refrigerant levels in the chilling unit.

Waste heat from the condensing unit 20 is used to heat the generator vessel 18 through pipelines 34a and 34b, preferably ⅛ inch refrigeration tubing. Valves 36 and 38 are provided to allow the hot gas from the condensing unit to flow to the generator during a separation operation and to by-pass the generator during system loading.

The upper storage vessels 16 and 16a are connected between the chilling unit 14 and the top of the column 12 through pipes 39a and 39b (⅞ inch refrigeration tubing and ½ inch refrigeration tubing respectively), the two storage vessels parallel with respect to one another. Shut-off valves 40a, 40b, 40c and 40d are provided to isolate each vessel from one another to enable flexibility in the operation of the system 10. Each vessel is provided with a pressure relief valve 42a and 42b for emergency pressure relief as well sight glasses 44a and 44b for observing the fluid level in each vessel. Further sight glasses 46 and 46a are provided at the top and bottom of the upper section of the system to ensure flooding of the upper section of the system and each vessel 16 and 16a. A sample testing valve 48 is provided to enable removal of small quantities of product from the upper vessels 16 and 16a for purity testing. Shut-off valve 48a is provided for product removal from either of the upper storage vessels 16 or 16a. A further shut off valve 50 is provided to close off the upper section of the system while filling. Reflux control valve 52 is provided to control the return of liquid to the top of the column 12 during operation.

At the top of the column 12 between the column 12 and chilling unit 14, a high pressure control unit 54, pressure relief valves 56 and 62 and shut-off valves 58 and 60 are provided. High pressure control unit 54 ensures that the condensing unit shuts down in the event of unusually high pressure in the column. Isolation valve 58 is used to isolate the top vessel(s) when purging and/or unloading the top vessel and purge valve 60 enables non-condensible gases to be purged from the system 10.

The column 12 is provided with an inlet valve 64 used for filling the system.

At the bottom of the column 12, gas inlet line 66 (⅞ inch refrigeration tubing) is provided with shut-off valve 68 and liquid outlet line 70 (⅞ inch refrigeration tubing) is provided with shut-off valve 72. Sight glass 74 is provided between lines 66 and 70 for determining the level of filling of the generator vessel 18.

Valves 76 and 78 are provided at the bottom of the generator vessel 18 for sample testing and product removal from the generator 18 respectively. The generator 18 is also provided with a relief valve 80.

With reference to FIGS. 2 and 2a, 3 and 3a and 4 and 4a, details of the fractional distillation column and packing material are shown. In general, the column 12 consist of a number of tubular sections 90 with a distributor plate 92 between each section and loose packing 94 between each distributor plate. The distributor plates are preferably a ⅛ inch copper plate with a plurality of holes 96 between opposite sides of the plate. The packing material is preferably ½ inch diameter copper tube, cut by a tube cutter to ½ inch lengths. In a preferred embodiment, the tubular sections of the column are each 16 inches long and have a 2⅝ inch diameter with the column 12 comprising 8 sections. A charging inlet 98 is provided mid-point to the column 12. The top of the column 12 is provided with a vapour outlet 100 and reflux feed 102. The bottom of the column 12 is provided with liquid outlet 104 and vapour inlet 106.

During operation, liquid from the reflux feed 102 falls by gravity through the column 12. The liquid passes through distributor plates 92 and contacts packing material 94 creating a thin film with a large surface area. Gas, flowing countercurrent to the falling liquid, contacts the falling liquid over a large surface area transferring heat to the falling liquid. The more volatile components of the falling liquid will vaporize while the less volatile components of the gas will condense within the column. Accordingly, the more volatile components will tend to accumulate in the upper sections of the column while the less volatile components will accumulate in the lower section.

OPERATION

A typical operating procedure for the refrigerant separation system 10 is described below:

1. Residual refrigerant from previous batches may be recovered from the system.
2. The system is evacuated to a pressure of 150 microns (approx 29.98 inches of mercury).
3. Mixed refrigerant is loaded into the top vessel 16 to a level which floods the upper vessel 16.

In a system having more than one top vessel 16, the appropriate vessel is selected depending upon the particular mixture being separated. For example, in a system having two top vessels having a 20 pound and 250 pound capacity respectively, and a mixture containing a 40/60 mix of R-12 and R-502 refrigerant gases with a total R-502 weight of 36 lbs, the selection of the top vessel is made on the basis of the capacity of the vessels and the total expected separation weights of each component which will keep the top vessel flooded during the complete separation process. Accordingly, as the R-502 component is the more volatile, it will separate to the top vessel. The 20 pound capacity vessel is selected as this vessel is the only one that could be continuously flooded during operation.

In the situation where it is desired to collect the bottom product, a sufficient quantity of the less volatile product must be present in the mixture to fill the lower vessel to a minimum of approximately 30% full and a maximum of approximately 90% full with sufficient total mixture weight to maintain flooding of the chosen upper vessel.

5. After loading, the system is turned on, that is, heat is supplied to the lower generator vessel to volatize the liquid in the lower vessel and the chilling unit condenses the vapour from the top of the column. A suction pressure of 10–25 psig is maintained at the condensing unit depending on the mixture being separated. The suction pressure is controlled by the reflux valve setting.

The system is operated in a manner such that the capacity of the chiller matches the reflux flow with the reflux control valve set to maintain flooding of the upper vessel and partially flood the chilling unit. Generally, the suction pressure of the condensing unit gives a good indication of the work being done in the chilling unit. It is important that the levels in the storage vessels remain constant during the run cycle. Accordingly, the top vessel is flooded in order that refrigerant backs up into the chilling unit to enable the chilling unit capacity to match the reflux rate. By setting a reflux rate, the suction pressure is controlled and the system approaches an equilibrium that maintains a consistent fluid level in the upper vessel. Accordingly, by setting a low reflux, fluid will back up into the chilling unit and partially flood the chilling unit. As the chilling unit is flooded, the effective surface area for cooling drops and the condensor suction pressure drops. A drop in suction pressure reduces the amount of cooling thereby decreasing the amount of flooding in the chilling unit. Accordingly, an self-regulating equilibrium is maintained within the chilling unit for a given reflux setting.

Generally, a higher suction pressure is used when the relative difference in volatilities in the mixture is lower, however, a lower reflux rate can help improve the separation of some mixes, for example, a 25 psi suction pressure may give 99.6% purity whereas a 15 psi suction pressure may give a 99.9% purity for the same mix. The system is typically run for 2–6 hours per 100 pounds of mixture, the run-time dependent upon the particulars of the actual mixture being separated.

6. The product is tested while the system is running through valves 48 and 76. If the desired purity is achieved within the top or bottom storage vessel, the system is stopped and the product vessel is isolated from the rest of the system to enable removal of the product.

EXAMPLE 1

A mixture containing 40% R-12 (Standard Pressure Boiling Point (1.0 atm), -21.6° F.) and 60% R-114 (Standard Pressure Boiling Point, 38.8° F.) having a total weight of 60 pounds was input to the refrigerant separation system. The system was run at a suction pressure of 12 psig and a discharge pressure of 110 psig at an ambient temperature of 70° F. After 4 hours operation, 40 pounds of bottom product was removed having a 99.8% purity R-114 and 0.2% R-12.

EXAMPLE 2

A mixture containing 7% R-12 (Standard Pressure Boiling Point, -21.6° F.) and 93% R-502 (Standard Pressure Boiling Point, -49.8° F.) having a total weight of 60 pounds was input to the refrigerant separation system. The system was run at a suction pressure of 20 psig and a discharge pressure of 110 psig at an ambient temperature of 70° F. After 4 hours operation, 20 pounds of top product was removed having a 99.7% purity R-502 and 0.3% R-12.

EXAMPLE 3

A mixture containing 4% R-12 (Standard Pressure Boiling Point, -21.6° F.) and 96% R-22 (Standard Pressure Boiling Point, -41.4° F.) having a total weight of 60 pounds was input to the refrigerant separation system. The system was run at a suction pressure of 10 psig and a discharge pressure of 110 psig at an ambient temperature of 70° F. After 4 hours operation, 20 pounds of top product was removed having a 97% purity R-22 and 3% R-12.

It is important to note that a desired purity level may not be achievable with a single batch process in view of the relative difference in volatility of the gases in the mixture or in view of the particular chemistry of a mixture. Accordingly, multiple separations can be performed through a series of batch processes to obtain the desired purity. With respect to example 3 above, it can be seen that while the relative difference in boiling points is similar to Example 2, the separation purity is not as successful. In this example, a natural azeotrope may form at certain relative percentages of R-22 and R-12 gases which impede the separation process. It is appreciated and understood by those skilled in the art that particular gas mixtures may require manipulation of the operating parameters to obtain a desired purity.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The embodiments of the invention in which an exclusive property of privilege is claimed are defined as follows:

1. A refrigerant separation system for separating a mixture containing at least two refrigerants, each refrigerant in the mixture having a different volatility, comprising:
   (i) a vapour generator for volatizing the mixture;
   (ii) a chilling unit for condensing the mixture;
   (iii) a fractional distillation column (FDC) in fluid communication between the vapour generator and chilling unit for effecting counter-current flow of gas and liquid phases of the mixture;
   (iv) a first storage vessel between the chilling unit and FDC for holding a liquid phase of the mixture from the chilling unit and for feeding the liquid phase to the FDC, the size of the first storage vessel being selected to ensure the first storage vessel is flooded and the chilling unit is partially flooded during a separation run;
   (v) means for controlling the reflux of liquid phase of the mixture from the first storage vessel to the FDC;
   (vi) second storage vessel for storing liquid phase of the mixture from the FDC and for supplying liquid phase of the mixture to the vapour generator, the first and second storage vessels being in fluid communication only through the FDC;
   wherein the system is closed and the chilling unit includes means for maintaining a self-regulating equilibrium between vaporization and condensation of refrigerant within the chilling unit for a given reflux.

2. A system as in claim 1 wherein the means for maintaining a self-regulating equilibrium includes a condensing unit operably connected to the chilling unit and to the vapour generator, the condensing unit for supplying cooling energy to the chilling unit and heating energy to the vapour generator, the chilling unit and condensing unit defining a refrigeration circuit.

3. A system as in claim 2 wherein the means for maintaining a self-regulating equilibrium includes a thermal expansion valve operably connected to the refrigeration circuit, the thermal expansion valve for controlling liquid refrigerant levels in the chilling unit.

4. A system as in claim 2 wherein the first storage vessel is at least two interconnected first storage vessels including means for selecting at least one of said at least two interconnected first storage vessels for use within the system.

5. A system as in claim 1 wherein the first storage vessel is at least two interconnected first storage vessels including means for selecting at least one of said at least two interconnected first storage vessels for use within the system.

6. A system as in claim 4 wherein the means for controlling the reflux of liquid phase of the mixture from the first storage vessel to the FDC is a valve between the first storage vessel and the FDC.

7. A system as in claim 6 wherein the column is vertical.

8. A system as in claim 7 wherein the FDC includes a column packing material selected from ½ inch copper refrigeration tubing cut to ½ inch lengths.

9. A system as in claim 8 wherein the FDC includes a loading inlet in the middle section of the column.

10. A system for separating a mixture containing at least two refrigerants, each refrigerant in the mixture having a different volatility, comprising:
   (i) fractional distillation column (FDC) having top, bottom and middle sections, the FDC for providing counter-current flow of liquid and gas phases of the mixture in the FDC, the FDC having a lower vapour inlet at the bottom of the column, a lower liquid exit at the bottom of the column, an upper vapour exit at the top of the column and an upper liquid inlet at the top of the column;
   (ii) chilling unit in fluid communication with the upper vapour exit for receiving a vapour phase of the mixture from the top of the FDC and for forming a liquid phase of the mixture;
   (iii) at least one first storage vessel in fluid communication between the chilling unit and FDC for receiving and holding the liquid phase from the chilling unit and for feeding the liquid phase to the FDC, the size of the at least one first storage vessel selected to ensure that the at least one first storage vessel is flooded and the chilling unit is partially flooded during a separation run;
   (iv) means for controlling the reflux of liquid phase of the mixture from the at least one first storage vessel to the fractional distillation column;
   (v) second storage vessel in fluid communication with the FDC for receiving and storing a liquid phase of the mixture from the bottom of the column, the at least one first storage vessel and second storage vessels being in fluid communication only through the FDC;
   (vi) vapour generator in fluid communication with the FDC and second storage vessel for volatizing the mixture;
   wherein the chilling unit also includes means for maintaining a self-regulating equilibrium between vaporization and condensation of refrigerant within the chilling unit for a given reflux, the means for maintaining a self-regulating equilibrium including:
   a condensing unit operably connected to the chilling unit and to the vapour generator, the condensing unit for supplying cooling energy to the chilling unit and for supplying heating energy to the vapour generator, and;
   a thermal expansion valve operably connected to the condensing unit and chilling unit, the thermal expansion valve responsive to the degree of cooling in the chilling unit for controlling liquid refrigerant levels in the chilling unit.

11. A process for separating a mixture containing at least two refrigerants, each refrigerant in the mixture having a different volatility, comprising the steps of:
   in a closed system:
   a) feeding a vapour phase of the mixture to the bottom of a fractional distillation column (FDC), the vapour phase in counter-current flow to a liquid phase of the mixture within the FDC;
   b) condensing the vapour phase at the top of the FDC within a chilling unit to form an upper liquid phase and holding the upper liquid phase in a first storage vessel wherein the size of the first storage vessel is selected to ensure that the first storage vessel is flooded and the chilling unit is partially flooded during the separation process;

c) feeding a portion of the upper liquid phase to the top of the FDC to provide the counter-current flow within the FDC and to form a lower liquid phase at the bottom of the FDC;

d) collecting and holding the lower liquid phase in a lower storage vessel;

e) volatizing the lower liquid phase to form the vapour phase for step a);

wherein a self-regulating equilibrium is maintained between vaporization and condensation of refrigerant within the chilling unit for a given reflux of upper liquid phase to the top of the FDC and wherein refrigerants of the mixture having a lower boiling point are concentrated within the upper storage vessel and refrigerants having a higher boiling point are concentrated in the lower storage vessel.

12. A process as in claim 11 wherein heat generated from condensing the upper vapour phase in the chilling unit is used in the lower storage vessel to volatize the lower liquid phase.

13. A process as in claim 12 wherein the separation purity of each refrigerant is greater than 99%.

* * * * *